Feb. 27, 1968  S. A. HENSTROM ET AL  3,370,663

STEERING DEVICE FOR A TRACK-LAYING VEHICLE

Filed July 21, 1965  2 Sheets-Sheet 1

INVENTORS
STEN AUGUST HENSTRÖM
SVEN ERIK BERGE
BY Hauss and Wydick

ATTORNEYS

Feb. 27, 1968   S. A. HENSTROM ET AL   3,370,663
STEERING DEVICE FOR A TRACK-LAYING VEHICLE
Filed July 21, 1965   2 Sheets-Sheet 2
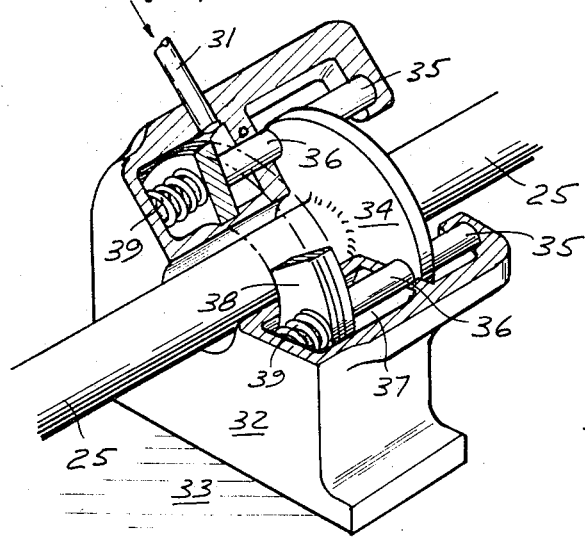
FIG. 3
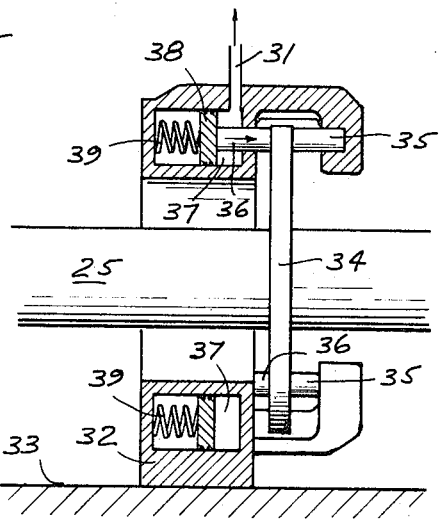
FIG. 4
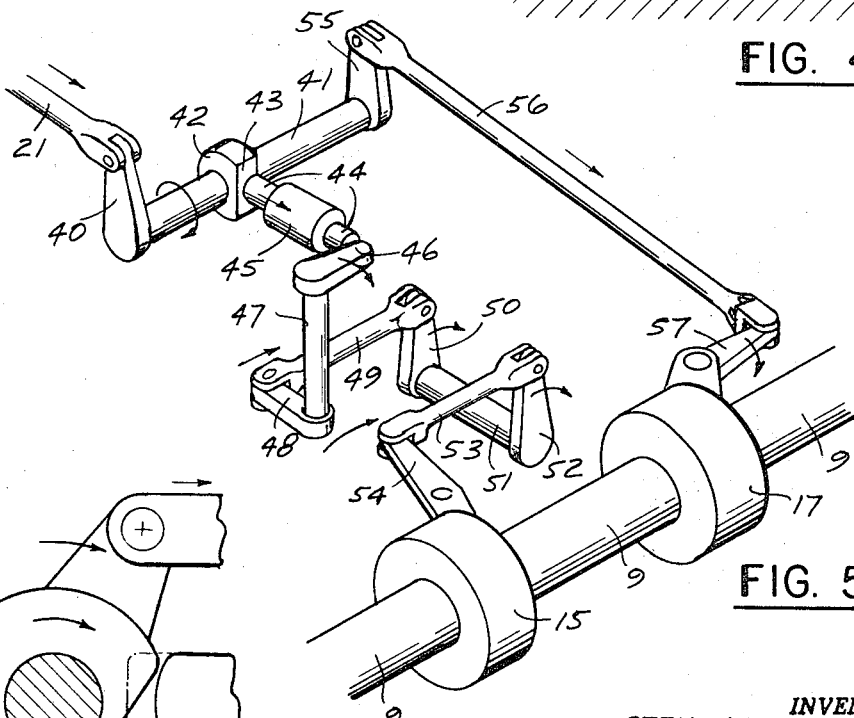
FIG. 5
FIG. 6
INVENTORS
STEN AUGUST HENSTRÖM
SVEN ERIK BERGE
BY
ATTORNEYS 3,370,663
STEERING DEVICE FOR A TRACK-
LAYING VEHICLE
Sten August Henstrom, Bofors, and Sven Erik Berge,
Stockholm, Sweden, assignors to Aktiebolaget Bofors,
Bofors, Sweden, a corporation of Sweden
Filed July 21, 1965, Ser. No. 473,635
Claims priority, application Sweden, July 31, 1964,
9,281/64
5 Claims. (Cl. 180—6.44)

ABSTRACT OF THE DISCLOSURE

A track-laying vehicle, especially a high speed combat vehicle, with a steering system which permits turning of the vehicle with great accuracy through a selected angle, for instance, for the purpose of aiming a gun mounted on the vehicle and also for very rapid and wide turns of the vehicle, for instance, to take evasive action. The vehicle also includes means to control turning of the vehicle even if part of the control system of the vehicle should fail, for instance, due to enemy action.

The present invention relates to a steering device for steering a track-laying vehicle, particularly for steering a vehicle of this kind designed to travel at a high speed.

The invention is particularly advantageous for use on combat vehicles, particularly on weapon carriers, the guns or missile launching devices of which are partly or completely aimed in traverse by turning the entire weapon carrier, and also for use on vehicles which or may be required to make wide and rapid changes in the direction of travel.

The standard arrangement for track-laying vehicles of the kind above referred to is to provide for each track of the vehicle a driving gear or wheel driven by a suitable motor and to steer the vehicle by driving one or the other of the tracks. Steering of the vehicle in this manner is rather crude. It may be adequate when the vehicle is used to mount earth moving equipment, but it is not sufficiently accurate when the vehicle is used as a weapon carrier which is aimed in the traverse by turning the entire vehicle.

Our co-pending application, Ser. No. 452,733, filed May 3, 1965, describes a steering device which provides a highly accurate, reliable and comparatively simple steering device for a track-laying vehicle. Broadly, the device, according to our prior invention, provides an auxiliary driving means which overrides the driving gears or wheels by applying a controllable additive or subtractive driving force to the main driving force applied by the driving wheels or gears to the tracks, thereby causing turning of the vehicle into the desired direction and through a desired accurately controllable angle.

As it is evident, the velocity with which a track-laying vehicle can be turned is limited by the friction between the tracks thereof and the ground upon which the tracks rest. In other words, the tracks will begin to slip when the velocity of the turning of the vehicle exceeds a maximum value which, of course, will vary with changes in the frictional grip of the tracks.

Tests have shown that the steering device as disclosed in our prior invention, while being highly accurate, does not produce a turning velocity which full utilizes the velocity acceptable by the grip of the tracks. As previously indicated, very rapid turning of the vehicle may be of crucial importance for a combat vehicle to meet a sudden change in the tactical situation in which the combat vehicle may be involved. Furthermore, a failure of the controllable auxiliary driving means according to the prior invention due to a mechanical failure or enemy action leaves the crew of the vehicle limited to a steering of the vehicle by means of the aforedescribed rather crude manipulation of the driving wheels or gears.

It is an object of the present invention to provide a novel and improved steering device for a track-laying vehicle which combines the high accuracy of the steering device according to our prior invention with a capability of making very rapid and wide turns.

It is also an object of the present invention to provide a novel and improved steering device for track-laying vehicles which permits a rapid and wide angle turning of the vehicle with a reasonable degree of accuracy even if the controllable precision steering device according to our prior invention should fail for any reason.

The aforementioned objects, features and advantages and other objects, features and advantages which will be pointed out hereinafter are attained by providing a steering device which comprises a main drive drivingly coupled with both tracks of the vehicle for driving the same with a uniform main driving force, auxiliary drive means coacting with the main drive for selectively superimposing to the main driving force an additive driving force at one track and a subtractive driving force at the other track to effect turning of the vehicle in a selected direction and through a selected angle, a clutch interposed between each track of the vehicle and the main drive, a brake interposed between each clutch and the respective track, and control means for controlling independently the clutch and brake assembly for each track. The control means permit a manipulation of the clutch and the brake for each track so that a powerful turning force is applied to the vehicle by braking the drive for one track only. The control of the direction of the vehicle by manipulating the clutches and the brakes is normally used in addition to the control of the angular position of the vehicle by the auxiliary drive. In the event that the auxiliary drive fails, the vehicle is still adequately steerable by means of the clutch and the brake assemblies. To protect the auxiliary drive in case of failure, the steering device of the present invention includes a locking means for immobilizing the auxiliary drive and the components associated therewith.

In the accompanying drawing, a preferred embodiment of the invention is shown by way of illustration and not by way of limitation.

In the drawing:

FIG. 3 is a perspective view, partly in section, of the locking means of the steering device;

FIG. 4 is a sectional view of the locking means of FIG. 3;

FIG. 5 is a perspective view of part of the linkage assembly of the steering device; and FIG. 6 is a sectional detail view of the part of the linkage assemblage shown in FIG. 5.

Figure 1:
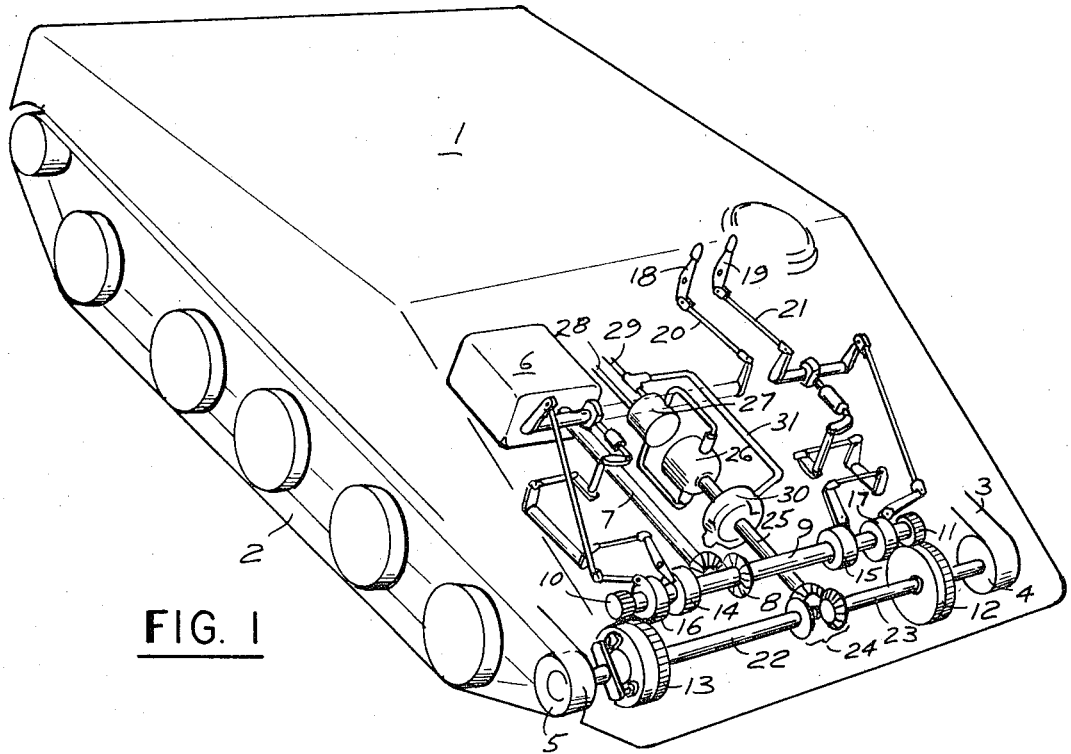
FIG. 1 shows diagrammatically a perspective view of a track-laying vehicle equipped with the steering device of the invention.
Figure 2:
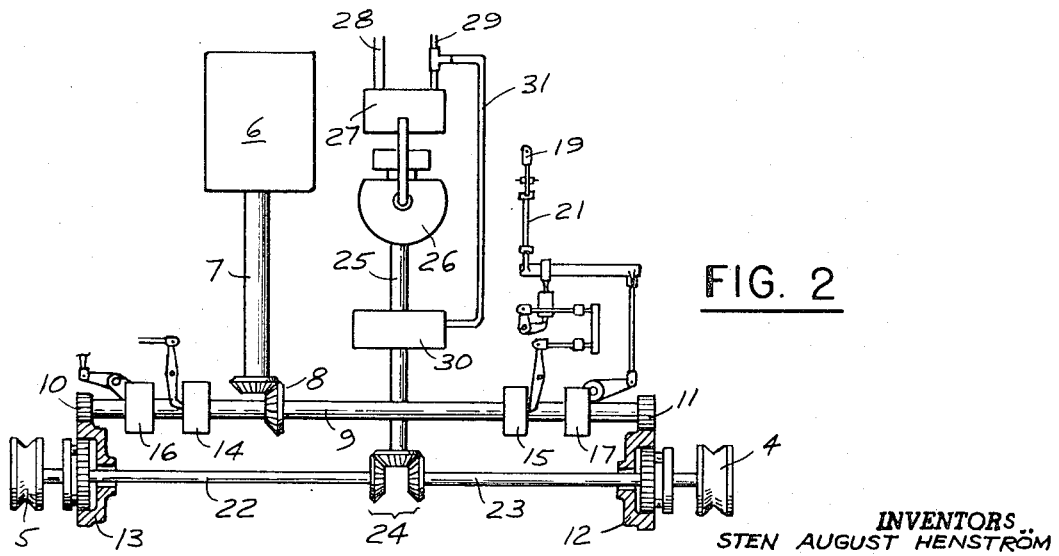
FIG. 2 is a further simplified diagram of the steering device.

Referring now to the figures in detail, FIG. 1 shows diagrammatically and to the extent necessary for the understanding of the invention a track-laying vehicle and more specifically the chassis 1 of such vehicle. The vehicle is driven in a conventional manner by track chains 2 and 3, which, in turn, are driven by driving gears or wheels 4 and 5. The driving force for wheels 4 and 5 is derived from a suitable engine, such as a diesel or gasoline internal combustion engine (not shown) via a gear box 6, a shaft 7, a bevel gear 8 and a shaft 9. The shaft 9 mounts, at its ends, gears 10 and 11, which are in mesh with gear means 13 and 12, respectively. These gear means are only diagrammatically shown and may be visualized as being planetary gears of suitable and conventional design. Each of the two gear means is drivingly coupled to driving wheels 4 and 5, respectively.

As it is shown in FIG. 1, shaft 7 is drivingly coupled to shaft 9 at an intermediate point of the latter. A clutch 14 and a brake 16 is interposed in shaft 9 between bevel gear 8 and gear 10 and similarly, a clutch 15 and a brake 17 is interposed between the bevel gear 8 and gear 11. The clutches and the brakes should be visualized as being of conventional design. The specific construction of the clutches and brakes does not constitute part of the present invention and is hence not described in detail. The clutch and brake assemblies 14 to 17 are actuated by levers 18, 19, respectively and rods 20, 21, respectively and linkages associated therewith as will be more fully described hereinafter in connection with FIGS. 5 and 6.

The aforedescribed driving force applied to tracks 2 and 3 via driving wheels 5 and 4 constitutes the main driving force for the tracks. In addition, an auxiliary or control driving force is applied to gears 12 and 13. This auxiliary driving force may be applied additively to one track and subtractively to the other track to effect turning of the vehicle through a desired angle and into a desired direction as has been more fully described in our previously referred to co-pending application.

The auxiliary or control driving force is supplied to gears 12 and 13 via shafts 22 and 23, both of which are drivingly coupled by bevel gears 24 to a common shaft 25. This shaft, in turn, is connected to an auxiliary driving means shown as a hydraulic or hydrostatic drive means, including a motor part 26 and a fluid control part 27. The hydraulic drive 26, 27 should be visualized as being of conventional design; it does not constitute part of the invention and it is hence not described in detail in the present application. The hydraulic drive is supplied with a suitable pressure fluid, such as oil, by means of a pipe system 28, 29.

A locking device 30 is included in shaft 25 and serves to immobilize the auxiliary drive means to protect the same, if necessary, as will be more fully described hereinafter. Locking device 30 is connected via a pipe 31 to pipe 29 which constitutes the pressure pipe of the pipe system.

The locking device, which is shown in detail in FIGS. 3 and 4, comprises a housing 32 which is suitably mounted on a portion 33 of the chassis 1 of the vehicle. Shaft 25 extends through housing 32 and mounts within the housing a disc 34 fixedly secured to the shaft or integral therewith. The disc coacts with a plurality of pins 35 and 36 disposed on opposite sides of the disc, each pin 35 facing a pin 36. Several pairs of pins 35, 36 are preferably provided in circumferentially spaced relationship. All the pins 35 are fixedly secured in housing 32, whereas pins 36 are lengthwise displaceable within an annular space 37 provided in housing 32. The pins are guided in bores through one of the housing wall portions defining space 37, as can be clearly seen in FIG. 4. At the ends of pins 36 opposite the ones facing disc 34, a ring 38 is provided. This ring is fitted into space 37 and is displaceable therein coaxially with shaft 25 and disc 34 thereon. One face side of ring 38 is engageable with the respective ends of pins 36, as it is clearly shown in FIGS. 3 and 4, and the other side of the ring is engaged by springs 39 fitted between the ring and the respective wall of housing 32, thereby urging ring 38 toward pins 36 and thus the pins against disc 34 which, in turn, is pressed against fixed pins 35.

Pipe 31, which we previously stated is connected to the pressure side of the hydraulic fluid system, communicates with space 37 at a point between ring 38 and the wall portion of housing 32 through which pins 36 extend. As a result, the pressure in the hydraulic system will counteract the pressure of springs 39 so that disc 34 and with it shaft 25 can freely turn in reference to pins 35 and 36. However, if the hydraulic pressure fails for any reason, disc 34 will be locked between pins 35 and 36 by the action of springs 39, or in any event, rotation of disc 34 and with it of shaft 25 will be strongly restrained.

Turning now to FIG. 5, this figure shows the linkage assembly for controlling clutch 15 and brake 17. The linkage assembly for controlling clutch 14 and brake 16 should be visualized as being substantially the same as it is evident from FIG. 1.

Rod 21 which is coupled to control lever 19, can be lengthwise displaced in the direction of the arrow by tilting lever 19 forwardly, that is, in the direction of travel of the vehicle. Such displacement of rod 21 turns a shaft 41 in clockwise direction by means of a crank 40 coupling rod 21 to shaft 41. Shaft 41 mounts a cam 42 which has a cylindrical outline except for a chamfered or flattened portion 43, as can best be seen in FIG. 6. The flattened portion 43 of cam 42 is so set that it is at a right angle with a bar 44 when control lever 19 and with it rod 21 are in the neutral or rest position which is the one shown in FIG. 1. Bar 44 is supported by a conventional cushioning or buffering device 45 and is coupled via a linkage assembly including links 46 through 54 to clutch 15. This clutch is so arranged, in a conventional manner, that it is normally in its engaged or coupling position. When lever 19 is tilted forwardly as previously described, cam 42 is turned from its rest position shown in FIG. 5 into the position shown in FIG. 6. Such turning of the cam will displace bar 44 which, in turn, will cause disengagement or release of clutch 15 via the afore-referred to linkage assembly 46 through 54. A comparatively slight rotation of cam 42 is sufficient to effect a full displacement of bar 44 and with it a full release of clutch 15. In other words, release of the clutch is effected by a comparatively slight tilting of control lever 19.

Shaft 41, which constitutes part of the assemblage for controlling clutch 15, is further coupled to a rod 56 via a link 55. Rod 56, in turn, is coupled via a link 57 to brake 17. The linkage for controlling brake 17 is so set that a displacement of rod 21, which is sufficient to effect a complete release of clutch 15, has only a negligible effect upon brake 17. However, when the tilting of lever 19 is continued beyond the angle required for release of clutch 15, the resulting further displacement of rod 21 will produce an increasingly strong braking action by brake 17 upon wheels 4 via shaft 9 driven by the engine of the vehicle. Obviously, the braking action can be accurately controlled by tilting lever 19 more or less.

The steering device as hereinbefore described operates as follows:

Assuming that only a minor angular change in the direction of travel of the vehicle is to be made, such minor change can be accurately and conveniently effected by the auxiliary driving means including hydraulic system 26, 27 and the associated components as it is more fully described in our aforementioned prior application. However, if a major and rapid change in the direction of the travel of the vehicle is to be made, such change is effected by controlling the clutch and brake assemblies 14 through 17.

Let it now be assumed that it is desired to make a sharp turn towards the left. The operator will then first release clutch 15 by a slight forward tilting of lever 19 and then apply brake 17 to the desired extent by further tilting lever 19. As a result, track 3 will be braked while track 2 will maintain its normal speed, whereby the vehicle will be forced to make a sharp turn towards the left. The auxiliary driving means may, of course, be simultaneously used to make the turning movement even more pronounced.

Similarly, a turn towards the right is effected by operating lever 18 in the same manner as lever 19.

As the change in the course of the vehicle will occur during a very short period of time, the power to slew the usually very heavy vehicle is automatically supplied by the inertia of the moving vehicle which has the additional advantage that part of this force of inertia is absorbed so that the vehicle can be brought to a rapid standstill, if desired.

Let it now be assumed that for any reason the auxiliary drive means 26, 27 is defective, so that it is no longer capable of rotating shaft 25 in the desired direction to apply an additive and subtractive force respectively, to gears 12 and 13. In case of such failure, locking device 30 automatically locks, or at least strongly brakes shaft 25. Such fail-safe device is highly advantageous since the auxiliary driving means is likely to be damaged if it does not function and the vehicle is steered by manipulating the clutch and brake assemblies. In any event, the auixiliary drive means, if not functioning, constitutes a dead weight which interferes with the steering operation by the clutch and brake assemblies.

As previously stated, the steering device of the invention permits very wide and abrupt changes in the course of the vehicle while at the same time permitting a high degree of accuracy when only minor changes in the direction of travel are to be made. Since the steering function by means of the auxiliary drive 26, 27 and the components associated therewith are used only for comparatively small changes in the course of the vehicle, the drive 26, 27 may be rather small and compact and it will also be much less expensive than if the auxiliary drive would be used to control the entire steering of the vehicle. Furthermore, even if the auxiliary drive would be as large and heavy as practical, it still would not be capable of providing by itself the powerful steering effect that can be obtained with the clutch and brake assemblies of the present invention and provide a maximum angular turning velocity limited only by the frictional grip of the tracks with the ground. Finally, since the steering function which is based upon the use of a clutch and brake assemblies is used only comparatively seldom, the useful life of such steering device is bound to be a very long one in comparison with conventional steering systems which use clutch and brake functions for all turns, irrespective whether the same are large or small.

Since the steering device of the invention includes two different steering systems which are functionally independent of each other, the track-laying vehicle can be controlled even if one of the steering systems should fail. As it is evident, such a dual steering means is of particularly great value for a combat vehicle, the more so as such vehicles are extremely expensive and inherently likely to be damaged.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A steering device for a track-laying vehicle having two tracks, said device comprising a main drive means drivingly coupled with both tracks of the vehicle for driving the same with a uniform main driving force, said main driving means including a common drive shaft for both tracks, a source of driving power connected to said common shaft at an intermediate point thereof, a driving member coupled with each track for driving the latter, and a gear means coupling each driving member with said common shaft; an auxiliary drive means coupled with both said driving members for selectively imparting to one of said members an additive driving force and to the other a subtractive driving force to effect turning of the vehicle into a selected direction, said auxiliary drive means including a source of auxiliary driving power; a transmission means coupling said source of auxiliary driving power with each of said driving members for the purpose aforesaid; releasable locking means included in said transmission means, said locking means including a bias means controlled by said source of auxiliary driving power and controlling said locking means, said bias means retaining said locking means in a released position when said source of auxiliary power is operational and freeing the locking means for movement into a position blocking the transmission means for transmission of power when said source of auxiliary driving power fails; a normally engaged clutch means interposed in said common shaft between said intermediate point thereof and each of said gear means; a brake means interposed between each of said clutch means and the respective gear means; a first control means for disengaging said clutch means and actuating said brake means on one side of said intermediate point; and a second control means for disengaging said clutch means and actuating said brake means on the other side of said intermediate point, each of said control means including means for independently controlling the respective clutch means and brake means.

2. A steering device according to claim 1, wherein a first actuation of either of said control means disengages the respective clutch means and a second actuation actuates the respective brake means.

3. A steering device according to claim 2, wherein each of said control means comprises a pivotal lever, and linkage means connecting said lever with the respective clutch means and the respective brake means, pivoting of said lever through a first predetermined angle disengaging the respective clutch means and pivoting of said lever beyond said first angle actuating said brake means for braking action.

4. A steering device according to claim 1, wherein said locking means comprises a movable transmission link included in said transmission means, a movable locking member, spring means biasing said locking member against said transmission link to restrain the same, said bias means controlled by said source of auxiliary driving power counteracting said spring means when and while said source of auxiliary driving power is operational and releasing said spring means for the purpose aforesaid when said source of auxiliary driving power is not operatonal.

5. A steering device according to claim 4, wherein said source of auxiliary driving power comprises a continuously variable gear means operable by a supply of pressurized fluid, and wherein said bias means comprise conduit means applying said pressurized fluid in opposition to the directional force of said spring means.

References Cited
UNITED STATES PATENTS

| | | | |
|---|---|---|---|
| 1,797,797 | 3/1931 | Saives | 74—720.5 |
| 2,336,912 | 12/1943 | Zimmermann | 180—6.44 |
| 2,560,554 | 7/1951 | Colby. | |
| 2,745,503 | 5/1956 | Fisher | 180—6.7 |

BENJAMIN HERSH, *Primary Examiner.*

J. A. PEKAR, *Assistant Examiner.*